United States Patent
Elcan et al.

(10) Patent No.: US 8,121,581 B2
(45) Date of Patent: Feb. 21, 2012

(54) WIRELESS COMMUNICATIONS METHODS AND DEVICES SELECTING CONFIGURATIONS FROM MULTIPLE CONFIGURATIONS STORED IN NONVOLATILE MEMORY

(75) Inventors: Philip Elcan, Hillsborough, NC (US); Carl Bray Toot, Jr., Raleigh, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 1373 days.

(21) Appl. No.: 11/687,856

(22) Filed: Mar. 19, 2007

(65) Prior Publication Data

US 2008/0234001 A1 Sep. 25, 2008

(51) Int. Cl.
*H04M 1/66* (2006.01)
(52) U.S. Cl. .................................. 455/411; 709/217
(58) Field of Classification Search .............. 455/419
See application file for complete search history.

(56) References Cited

U.S. PATENT DOCUMENTS

| 6,256,635 | B1 | 7/2001 | Arrouye et al. |
| 2002/0151298 | A1 * | 10/2002 | Muhonen ................ 455/418 |
| 2004/0242197 | A1 * | 12/2004 | Fontaine ................ 455/411 |
| 2004/0253947 | A1 * | 12/2004 | Phillips et al. ........... 455/422.1 |

FOREIGN PATENT DOCUMENTS

EP 1059822 A2 12/2000

OTHER PUBLICATIONS

International Search Report, PCT/US2007/022249, Jun. 4, 2008.

\* cited by examiner

*Primary Examiner* — Dwayne Bost
*Assistant Examiner* — Joseph Dean, Jr.
(74) *Attorney, Agent, or Firm* — Myers Bigel Sibley & Sajovec, P.A.

(57) ABSTRACT

A wireless communications device obtains a configuration identifier and selects a wireless communications configuration from among a plurality of wireless communications configurations stored in a non-volatile memory of the wireless communications device based on the configuration identifier. The wireless communications device applies the selected wireless communications configuration to configure the device for use with a network. Respective ones of the plurality of wireless communications configurations may correspond to respective networks; and the configuration identifier may include a network identifier obtained, for example, from a subscriber identity module (SIM) engaged with the wireless communications device.

21 Claims, 5 Drawing Sheets

WIRELESS COMMUNICATIONS METHODS AND DEVICES SELECTING CONFIGURATIONS FROM MULTIPLE CONFIGURATIONS STORED IN NONVOLATILE MEMORY

FIELD OF THE INVENTION

This invention relates to wireless communications devices and methods of operation thereof and, more particularly, to configuration of wireless communications devices.

BACKGROUND OF THE INVENTION

Wireless communications systems are now widely used for voice and data communications applications. A variety of different types of devices may be used with a wireless (e.g., cellular) network, including, but not limited to mobile terminals, notebook computers or personal digital assistants (PDAs) with built-in wireless transceivers, and peripheral devices, such as wireless broadband cards, that may be used to provide wireless communications for computers and other electronic devices.

In the United States, devices used for cellular services are often sold customized for the particular network to which the user subscribes. For example, mobile terminals and mobile broadband cards are typically sold through distribution channels associated with particular carriers, and are factory configured to work with the carrier's network. In particular, these devices may be preprogrammed with algorithms and/or parameters that are tailored to particularities of the carrier's network.

Often, this customization is carried out by factory programming of non-volatile memory, e.g., flash memory, contained within the device. For example, a network-specific executable image that controls operation of the device may be stored in the flash memory by the manufacturer. After sale of the device to a user, this image may be loaded and executed responsive to power-up of the device. A network-specific parameter file that includes customized parameter values may also be factory programmed into the non-volatile memory and read during startup of the device to provide device configuration.

SUMMARY OF THE INVENTION

Some embodiments of the present invention provide methods of operating a wireless communications device, such as a mobile terminal or a wireless communications peripheral device. A configuration identifier is obtained by the wireless communications device. The device selects a wireless communications configuration from among a plurality of wireless communications configurations stored in a non-volatile memory of the wireless communications device based on the configuration identifier. The wireless communications device applies the selected wireless communications configuration to configure the device for use with a network. Respective ones of the plurality of wireless communications configurations may correspond to respective networks, and the configuration identifier may include a network identifier obtained, for example, from a subscriber identity module (SIM) engaged with the wireless communications device. The plurality of wireless communications configurations may include information stored in the non-volatile memory prior to a transfer of the device to a user, and obtaining the configuration identifier, selecting a wireless communications configuration from among the plurality of wireless communications configurations and applying the selected wireless communications configuration may occur subsequent to the transfer of the wireless communications device, e.g., when the user powers up the device.

In some embodiments, selecting a wireless communications configuration from among a plurality of wireless communications configurations stored in the non-volatile memory of the wireless communications device may include selecting an executable image from among a plurality of executable images stored in the non-volatile memory. Applying the selected wireless communications configuration to configure the device for use with a network may include executing the selected executable image.

Further embodiments provide methods of configuring a wireless communications device. A plurality of wireless communications configurations is stored in a non-volatile memory of the wireless communications device, respective ones of the wireless communications configurations corresponding to respective wireless communications networks. A processor of the wireless communications device is configured to select and apply a wireless communications configuration from among the stored plurality of wireless communications configurations device based on a configuration identifier, such as a network identifier obtained from a SIM.

In further embodiments of the present invention, a wireless communications peripheral device, such as a mobile broadband card, includes a wireless communications transceiver and a connector coupled to the wireless communications transceiver and configured to be connected to an electronic device to support communications for the electronic device via the wireless communications transceiver. The peripheral device further include a nonvolatile memory and a processor operatively associated with the wireless communications transceiver and the non-volatile memory and configured to obtain a configuration identifier, to select a wireless communications configuration from among a plurality of wireless communications configurations in the non-volatile memory based on the configuration identifier, and to apply the selected wireless communications configuration to configure the wireless communications interface device for use with a network. Respective ones of the plurality of wireless communications configurations may correspond to respective wireless communications networks and the configuration identifier may include a network identifier obtained, for example, from a SIM.

Further embodiments provide a mobile terminal including a wireless communications transceiver, a non-volatile memory and a processor operatively associated with the wireless communications transceiver and the non-volatile memory and configured to obtain a configuration identifier, to select a wireless communications configuration from among a plurality of wireless communications configurations in the non-volatile memory based on the configuration identifier, and to apply the selected wireless communications configuration to configure the wireless communications interface device for use with a network. Respective ones of the plurality of wireless communications configurations may correspond to respective wireless communications networks and the configuration identifier may include a network identifier.

BRIEF DESCRIPTION OF THE DRAWINGS

FIG. 1 is a block diagram illustrating a wireless communications device according to some embodiments of the present invention.

FIG. 2 is a flowchart illustrating operations of the wireless communications device of FIG. 1.

DETAILED DESCRIPTION

Figure 1:
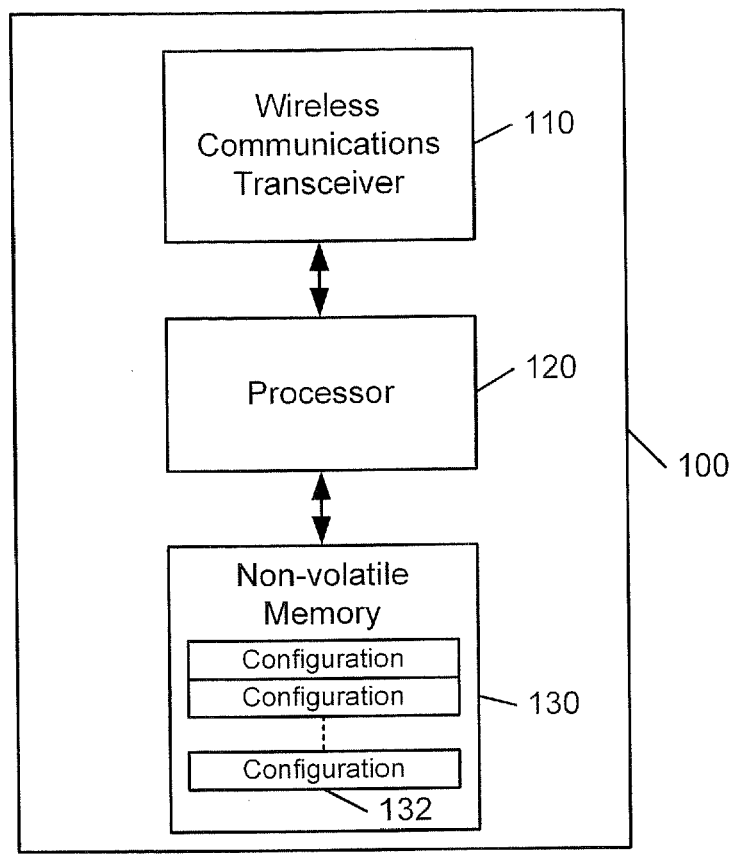

The present invention now will be described more fully hereinafter with reference to the accompanying figures, in which embodiments of the invention are shown. This invention may, however, be embodied in many alternate forms and should not be construed as limited to the embodiments set forth herein.

Accordingly, while the invention is susceptible to various modifications and alternative forms specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising," "includes" and/or "including" (and variants thereof) when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" to another element/step (and variants thereof), it can be directly responsive to the other element/step, or intervening elements/steps may be present. In contrast, when an element/step is referred to as being "directly responsive" to another element/step (and variants thereof), there are no intervening elements/steps present. As used herein the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another.

The present invention is described below with reference to block diagrams and/or flowchart illustrations of methods, apparatus (systems and/or devices) and/or computer program products according to embodiments of the invention. It is understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means (functionality) and/or structure for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act as specified in the block diagrams and/or flowchart block or blocks.

The computer program instructions may also be loaded onto a computer or other programmable data processing apparatus to cause a series of operational steps to be preformed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate or transport the program for use by or in connection with the instruction execution system, apparatus, or device.

The computer-usable or computer-readable medium may be, for example but not limited to, an electronic, magnetic, optical, electromagnetic or semiconductor system, apparatus or device. More specific examples (a non-exhaustive list) of the computer-readable medium would include the following: a portable computer diskette, a random access memory (RAM), a read-only memory (ROM), an erasable programmable read-only memory (EPROM or Flash memory), and a portable optical and/or magnetic media, such as a flash disk or CD-ROM.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated.

FIG. 1 illustrates a wireless communications device 100 according to some embodiments of the present invention. The wireless communications device 100 may be, for example, a mobile terminal, a mobile broadband card or similar wireless communications peripheral device, or a computer or other electronic device with built-in wireless communications capabilities. Thus, the wireless communications device 100 may include a variety of circuitry to support, for example, a man-machine interface and applications, such as electronic mail, media recording/playback and the like. For purposes of clarity of illustration, such circuitry is not shown in FIG. 1.

As shown, the wireless communications device 100 includes a wireless communications transceiver circuit 110 configured to support communications with a wireless communications network, such as a cellular network. The wireless transceiver circuit 110 is operatively associated with a processor 120, e.g., a microprocessor or microcontroller, which controls operations of the wireless transceiver circuit 110, and which may send and receive data via the wireless transceiver circuit 110.

A non-volatile memory 130, for example, a NAND flash EEPROM, is also coupled to the processor 120. Generally, depending on the nature of the device 100, the memory 130 may be configured to store executable programs and/or data that are executed and/or otherwise used by the processor 120 to control operations of the device 100. For example, if the device 100 is a cellular mobile terminal, the memory 130 may be used to store data associated with use of the device 100, such as user personal information, audio, still image, video or other user files, and the like.

As illustrated, a plurality of configurations 132 is stored in the memory 130. Respective ones of the configurations 132 correspond to respective different networks (e.g., networks supported by different carriers) with which the device 100 may be configured to communicate. Generally, the configurations 132 may include a variety of different types of information. For example, in some embodiments, the configurations 132 may include respective executable images, i.e., respective programs that may be loaded and executed by the processor 120 to configure the device 100 to communicate with respective different networks. In further embodiments, the configurations 132 may include respective parameter files that may be read by the processor 120 to configure the device 100 to be used with a particular network.

The configurations 132 may be provided in a number of different ways. For example, in some embodiments of the invention, the configurations 132 may be programmed into the memory 130 prior to transfer (e.g., sale) of the device to a user, such that, when the user powers up or otherwise activates the device 100, an appropriate configuration 132 is selected and used to configure the device for operation with a particular network. For example, in some embodiments described below, the configuration identifier may be a network identifier, which may be used to select from among a plurality of executable images and/or parameter files stored in the memory 130.

Figure 2:
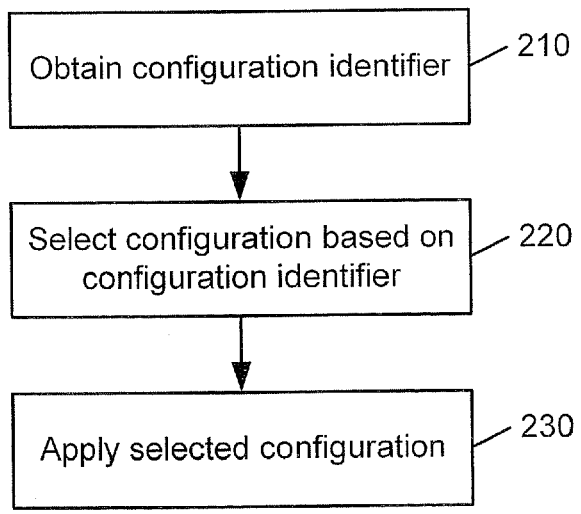

FIG. 2 illustrates exemplary configuration operations for the device 100 of FIG. 1. A configuration identifier, for example, a network identifier, is obtained (block 210). Based on the configuration identifier, the device selects a configuration from a plurality of configurations that have been preloaded in an on-volatile memory of the device (block 220). The device then applies the selected configuration to configure the device to communicate with a network associated with the configuration (block 230).

Figure 3:
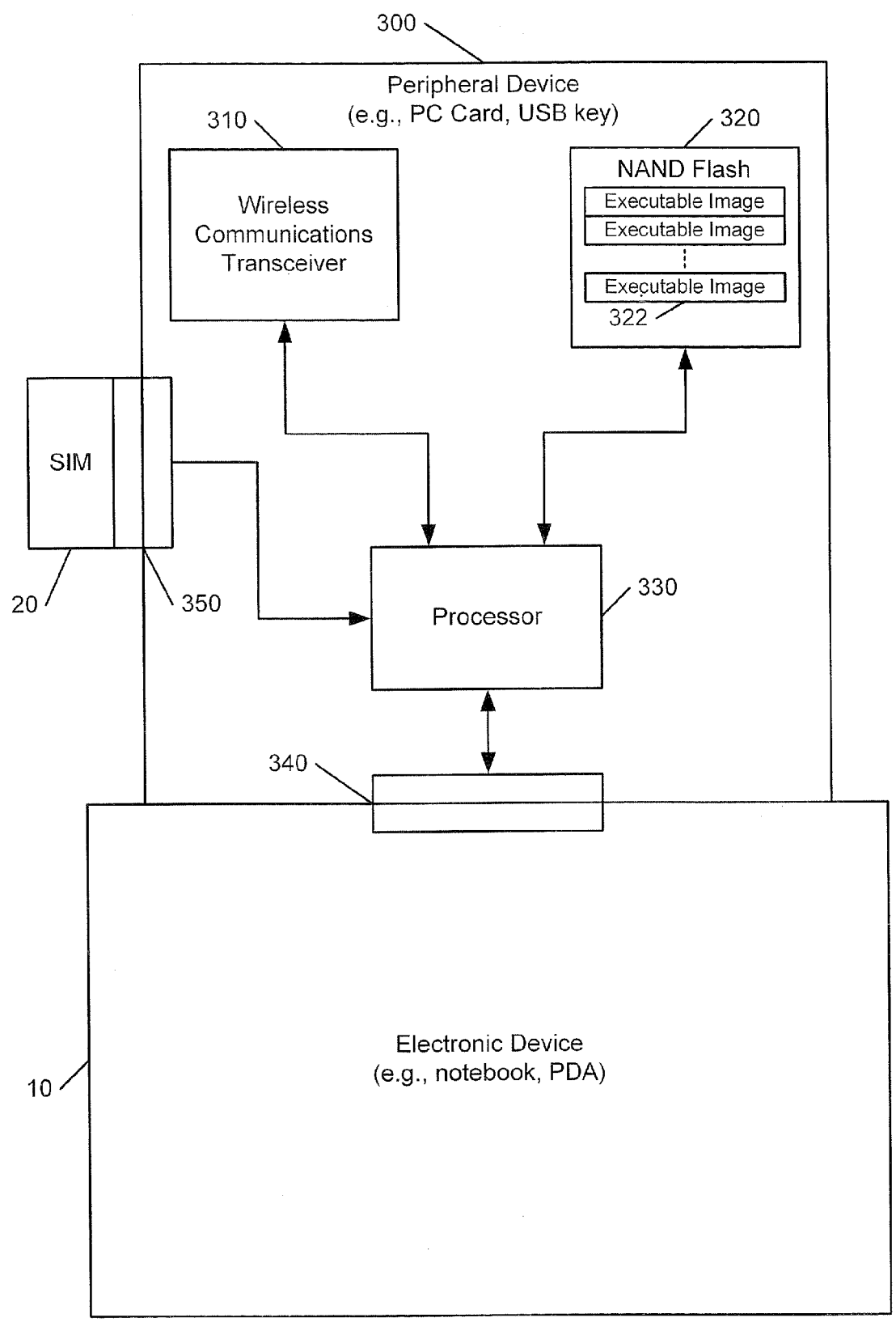
FIG. 3 is a block diagram illustrating a wireless communications peripheral device according to some embodiments of the present invention.
Figure 4:
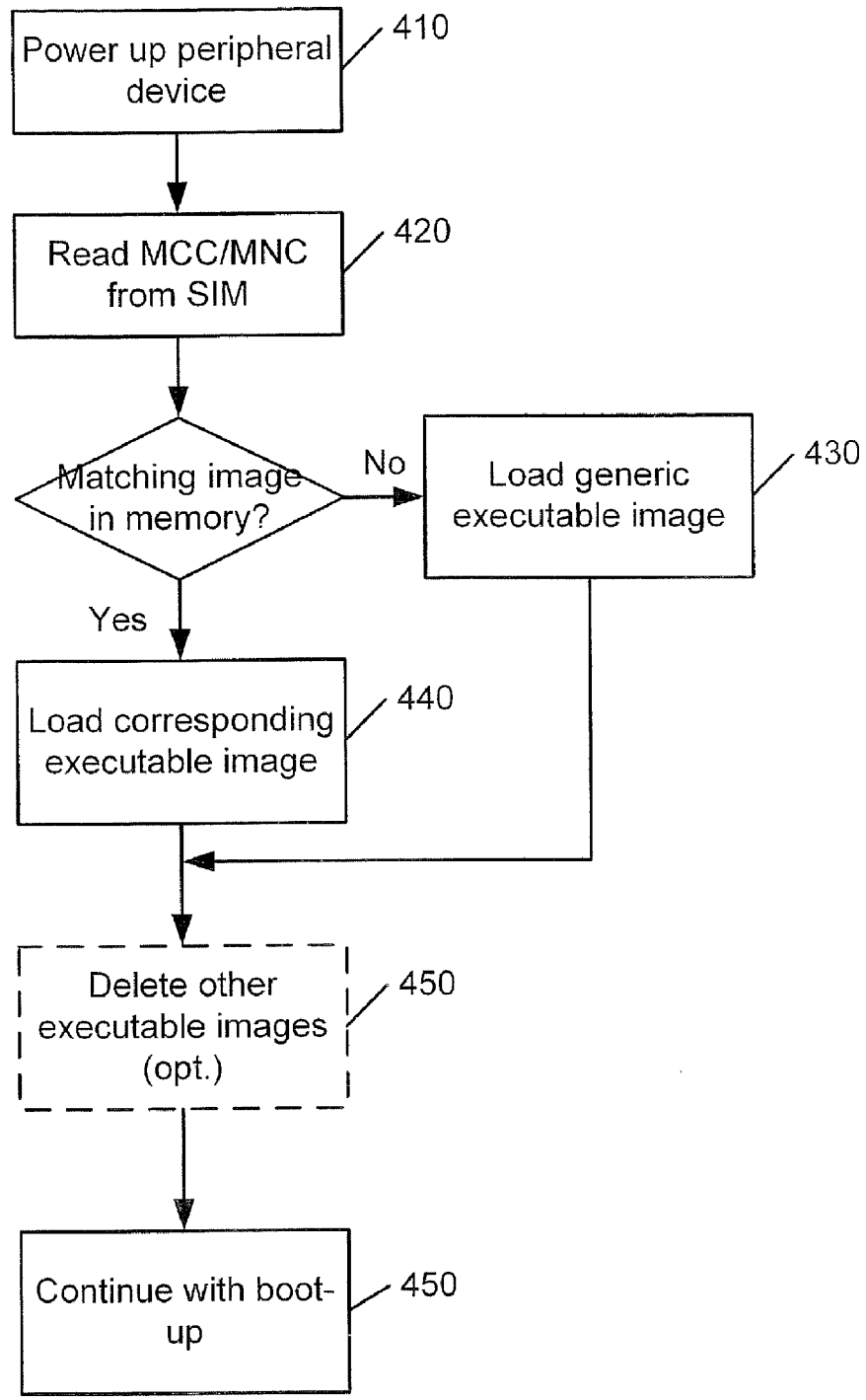
FIG. 4 is a flowchart illustrating operations of the wireless communications device of FIG. 3.

FIGS. 3 and 4 illustrate an exemplary wireless communications device according to some embodiments of the present invention, more particularly a wireless communications peripheral device 300, e.g., a PC card, mini-PCI card, Express card, USB key or the like, configured to provide wireless communications for another electronic device 10, such as a computer. The peripheral device 300 includes a processor 330 operatively associated with a wireless transceiver 310 and a NAND flash memory 320. The processor 330 is configured to communicate with the electronic device 10 via a first connector 340, and with a subscriber identity module (SIM) 20 via a second connector 350.

The NAND flash memory 320 has a plurality of executable images 322a stored therein, respective ones of which correspond to respective different networks for which the device 300 may be configured. Referring to FIG. 4, which illustrates exemplary operations of the device 300, responsive to power up of the device 300 (block 410), the processor 330 may read a network identifier, such as a combination of a Mobile Country Code (MCC) and Mobile Network Code (MNC) stored in the SIM 20 (block 420). If the network identifier does not correspond to one of the network-specific executable images stored in the flash memory 320, the processor may select and load a "generic" executable image, i.e., one that is not specifically tailored to a particular network (block 430). If the network identifier does correspond to a network-specific executable image stored in the memory, however, the processor selects and loads the corresponding executable image (block 440). After loading the appropriate generic or network-specific executable image, the processor 330 may delete other executable images stored in the memory 320 such that, for example, the memory space formerly occupied by these images may be used for user data or other storage (block 450). After loading an executable image, further start-up of the device may proceed (block 460).

Figure 5:
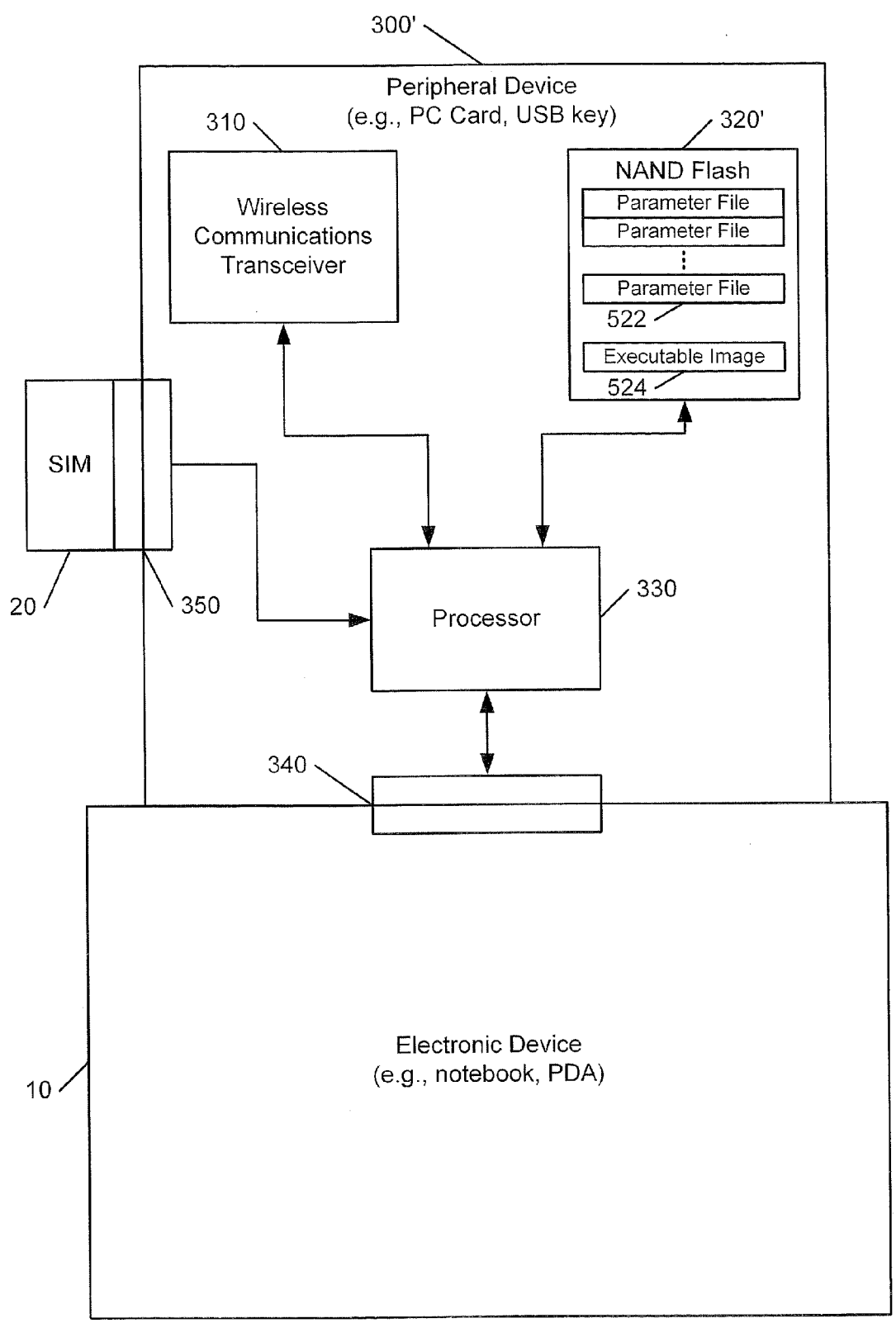
FIG. 5 is a block diagram illustrating a wireless communications peripheral device according to further embodiments of the present invention.
Figure 6:
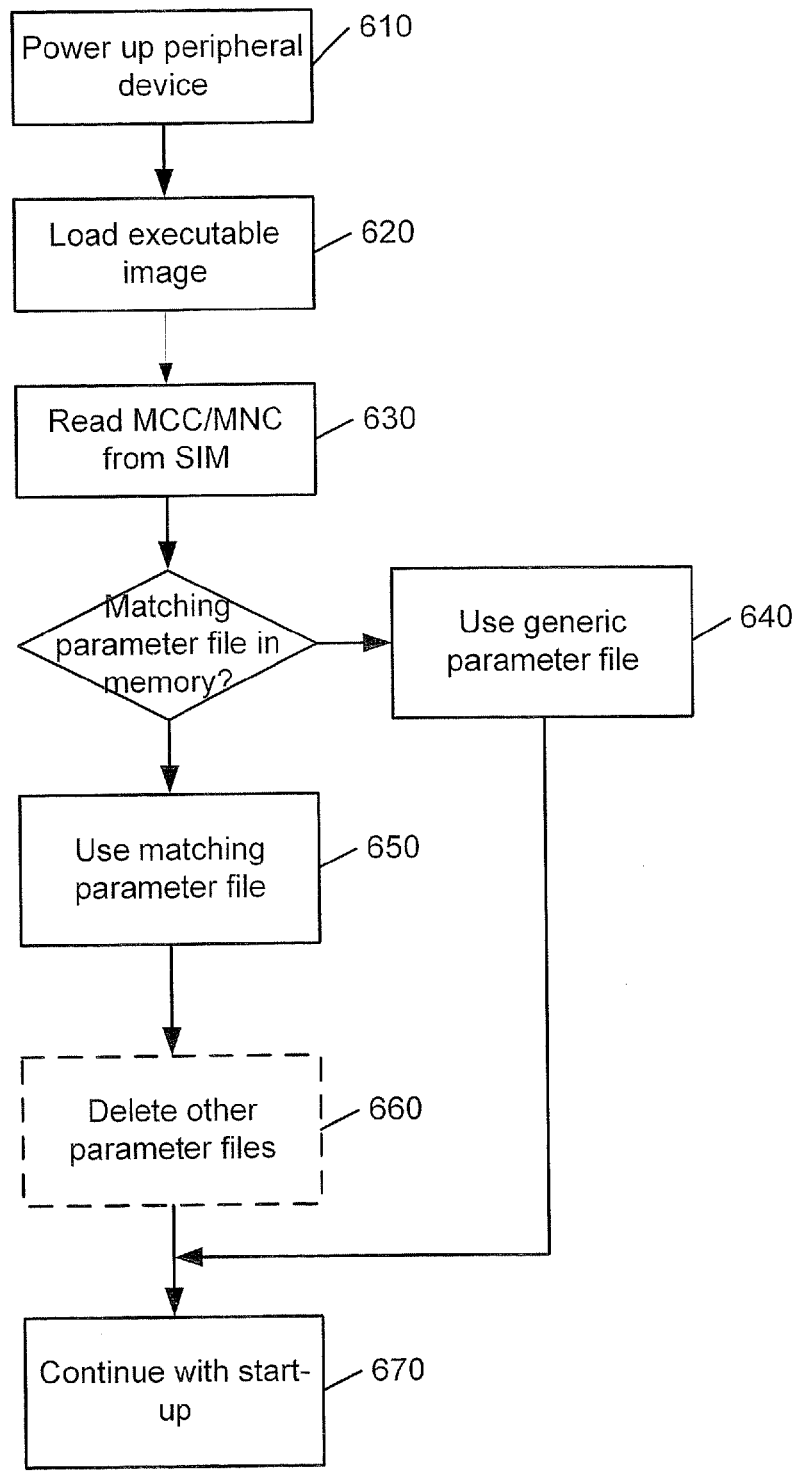
FIG. 6 is a flowchart illustrating operations of the wireless communications device of FIG. 5.

As noted above, configurations may be stored in non-volatile memory in other ways, such as in parameter files. For example, as shown in FIG. 5, a wireless peripheral device 300' may include a processor 330, wireless communications transceiver circuit 310 and connectors 340, 350 as described above with reference to FIG. 3. The device 300', however, may include a flash memory 320' that is programmed with an executable image 524 and a plurality of parameter files 522, respective ones of which correspond to respective communications networks for which the device 300' may be configured. Referring to FIG. 6, which illustrates exemplary operations of the device 300', upon power up of the device 300' (block 610), the executable image 524 may be loaded from the memory 320' and executed by the processor (block 620). A network identifier may then be read from the SIM 20 (block 630). If a parameter file corresponding to the network identifier is not stored in the memory 320', the processor 330 may retrieve a generic parameter file and configure the device 300' accordingly (block 640). If a network-specific parameter file 522 stored in the memory 320' does correspond to the network identifier, however, the parameter file 522 corresponding to the network identifier is retrieve and parameters therein used to configure the device 300' (block 650). After applying the generic parameter file or a network-specific parameter file, unused ones of the parameter files 522 may be deleted to free memory space for other uses (block 660). Operation of the device may then continue (block 670).

It will be appreciated that the apparatus and operations illustrated in FIGS. 3-6 are provided for purposes of the illustration, and that the invention may be embodied in a number of other ways. For example, the functions of FIGS. 3-6 may be incorporated in a device other than a wireless communications peripheral device, such as in a mobile terminal or a computer with built in wireless communications capability. The functions of FIGS. 3-6 may also be combined, for example, a wireless communications device may be configured to selectively load both executable images and parameter files along lines discussed above.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A method of operating a wireless communications device, the method comprising the following operations performed by the wireless communication device: obtaining a configuration identifier; selecting a wireless communications configuration from among a plurality of wireless communications configurations stored in a non-volatile memory of the wireless communications device based on the configuration identifier; wherein selecting a wireless communications configurations from among a plurality of wireless communications configurations stored in the non-volatile memory of the wireless communication device based on the configuration identifier comprises selecting an executable image from among a plurality of executable images stored in the non-volatile memory; and applying the selected wireless communications configuration to configure the device for use with a network, wherein applying the selected wireless communications configuration to configure the device for use with a network comprises executing the selected executable image.

2. The method of claim 1, wherein respective ones of the plurality of wireless communications configurations correspond to respective networks, and wherein the configuration identifier comprises a network identifier.

3. The method of claim 2, wherein obtaining a configuration identifier comprises obtaining the network identifier from a subscriber identity module (SIM) engaged with the wireless communications device.

4. The method of claim 1, wherein the plurality of wireless communications configurations comprise information stored in the non-volatile memory prior to a transfer of the device to a user, and wherein obtaining the configuration identifier, selecting a wireless communications configuration from among the plurality of wireless communications configurations and applying the selected wireless communications configuration occur subsequent to the transfer of the device.

5. The method of claim 1, wherein selecting a wireless communications configuration from among a plurality of wireless communications configurations stored in the non-volatile memory of the wireless communications device based on the configuration identifier and applying the selected wireless communications configuration to configure the device for use with a network occur responsive to powering up the wireless communications device.

6. The method of claim 1, wherein the wireless communications device comprises a mobile terminal, a computer peripheral or a computer.

7. A method of configuring a wireless communications device, the method comprising:
storing a plurality of wireless communications configurations in a non-volatile memory of the wireless communications device, respective ones of the wireless communications configurations corresponding to respective wireless communications networks, wherein the plurality of wireless communications configurations comprises a plurality of executable images; and configuring a processor of the wireless communications device to select and execute an executable image from among the plurality of executable images based on a configuration identifier.

8. The method of claim 7, wherein configuring a processor of the wireless communications device to select and apply a wireless communications configuration from among the stored plurality of wireless communications configurations based on a configuration identifier comprises configuring the processor to select and apply a wireless communications configuration from among the stored plurality of wireless communications configurations based on a network identifier.

9. The method of claim 8, wherein configuring the processor to select and apply a wireless communications configuration from among the stored plurality of wireless communications configurations device based on a network identifier comprises configuring the processor to select a wireless communications configuration from among the stored plurality of wireless communications configurations based on a network identifier obtained from a SIM.

10. The method of claim 7, wherein configuring a processor of the wireless communications device to select and apply a wireless communications configuration from among the stored plurality of wireless communications configurations based on a configuration identifier comprises configuring the processor to select and apply a wireless communications configuration from among the stored plurality of wireless communications configurations responsive to power up of the wireless communications device.

11. The method of claim 7, wherein storing the plurality of wireless communications configurations and configuring a processor of the wireless communications device to select and apply a wireless communications configuration from among the stored plurality of wireless communications configurations occur prior to transfer of the wireless communications device to a user.

12. A wireless communications peripheral device, comprising: a wireless communications transceiver; a connector coupled to the wireless communications transceiver and configured to be connected to an electronic device to support communications for the electronic device via the wireless communications transceiver; a non-volatile memory; and a processor operatively associated with the wireless communications transceiver and the non-volatile memory and configured to obtain a configuration identifier, to select a wireless communications configuration from among a plurality of wireless communications configurations in the non-volatile memory based on the configuration identifier, and to apply the selected wireless communications configuration to configure the wireless communications interface peripheral device for use with a network, wherein the plurality of configurations comprises a plurality of executable images, and wherein the processor is configured to select an executable image from among the plurality of executable images based on the configuration identifier and to load and execute the selected executable image to control operation of the wireless communication transceiver.

13. The peripheral device of claim 12, wherein respective ones of the plurality of wireless communications configurations correspond to respective wireless communications networks and wherein the configuration identifier comprises a network identifier.

14. The peripheral device of claim 13, further comprising a connector configured to mate with a SIM, and wherein the processor is configured to obtain the network identifier from the SIM.

15. The peripheral device of claim 12, wherein the plurality of configurations comprises a plurality of parameter sets, and wherein the processor is configured to select a parameter set from among the plurality of parameter sets based on the configuration identifier and to control the wireless communications transceiver according to parameters in the selected parameter set.

16. The peripheral device of claim 12, wherein the wireless communications transceiver, the connector, the non-volatile memory and the processor are integrated in an assembly configured to be removably attached to the electronic device.

17. The peripheral device of claim 12, configured as a computer peripheral card.

18. A mobile terminal comprising:
a wireless communications transceiver; a non-volatile memory; and a processor operatively associated with the wireless communications transceiver and the non-volatile memory and configured to obtain a configuration identifier, to select a wireless communications configuration from among a plurality of wireless communications configurations in the non-volatile memory based on the configuration identifier, and to apply the selected wireless communications configuration to configure the wireless communications interface device for use with a network, wherein the plurality of configurations comprises a plurality of executable images, and wherein the processor is configured to select an executable image from among the plurality of executable images based on the configuration identifier and to load and execute the selected executable image to control operation of the wireless communication transceiver.

19. The mobile terminal of claim 18, wherein respective ones of the plurality of wireless communications configurations correspond to respective wireless communications networks and wherein the configuration identifier comprises a network identifier.

20. The mobile terminal of claim 19, further comprising a connector configured to mate with a SIM, and wherein the processor is configured to obtain the network identifier from the SIM.

21. The mobile terminal of claim 18, wherein the plurality of configurations comprises a plurality of parameter sets, and wherein the processor is configured to select a parameter set from among the plurality of parameter sets based on the configuration identifier and to control the wireless communications transceiver according to parameters in the selected parameter set.

* * * * *